United States Patent
Lee et al.

(10) Patent No.: US 10,742,898 B2
(45) Date of Patent: Aug. 11, 2020

(54) METHOD AND APPARATUS FOR VERIFYING TIME AND LOCATION OF IMAGE DATA OF CAMERA FOR VEHICLE WHILE ANONYMITY OF OWNER IS GUARANTEED

(71) Applicant: INDUSTRY-UNIVERSITY COOPERATION FOUNDATION HANYANG UNIVERSITY ERICA CAMPUS, Ansan-si (KR)

(72) Inventors: Suk Bok Lee, Seoul (KR); Min Ho Kim, Seoul (KR); Jae Min Lim, Ansan-si (KR); Eun Su Lee, Suwon-si (KR); Hyun Woo You, Incheon (KR); Ki Yeon Kim, Gwacheon-si (KR)

(73) Assignee: Industry-University Cooperation Foundation Hanyang University Erica Campus, Gyeonggi-do (KR)

( * ) Notice: Subject to any disclaimer, the term of this patent is extended or adjusted under 35 U.S.C. 154(b) by 0 days.

(21) Appl. No.: 15/761,003

(22) PCT Filed: Jul. 20, 2016

(86) PCT No.: PCT/KR2016/007877
§ 371 (c)(1),
(2) Date: Mar. 16, 2018

(87) PCT Pub. No.: WO2017/047922
PCT Pub. Date: Mar. 23, 2017

(65) Prior Publication Data
US 2018/0262694 A1    Sep. 13, 2018

(30) Foreign Application Priority Data

Sep. 16, 2015  (KR) .................. 10-2015-0130933
Apr. 11, 2016  (KR) .................. 10-2016-0044338

(51) Int. Cl.
*H04N 5/00*       (2011.01)
*H04N 5/247*      (2006.01)
(Continued)

(52) U.S. Cl.
CPC .......... *H04N 5/247* (2013.01); *H04W 12/02* (2013.01); *H04W 48/10* (2013.01);
(Continued)

(58) Field of Classification Search
CPC ...... G08G 1/01; G08G 1/0145; G08G 1/0133; G08G 1/0141; G01C 21/32; H04W 4/029
See application file for complete search history.

(56) References Cited

U.S. PATENT DOCUMENTS 7,683,937 B1 * 3/2010 Blumenfeld ....... H04N 5/23203
                                                                348/211.11
8,547,414 B2 * 10/2013 Sheeley ................ G06F 3/0416
                                                                345/173
(Continued)

FOREIGN PATENT DOCUMENTS

KR   10-2011-0037047 A   4/2011
KR   10-2012-0000714 A   1/2012
KR   10-2013-0134572 A   12/2013

OTHER PUBLICATIONS

Choi et al., "Video Data Collection Scheme From Vehicle Black Box Using Time and Location Information for Public Safety," *Journal of the Korea Institute of Information Security and Cryptology* 22(4):771-783, 2012.
(Continued)

*Primary Examiner* — Frank F Huang
(74) *Attorney, Agent, or Firm* — Seed IP Law Group LLP (57) ABSTRACT

Disclosed are a method and an apparatus for verifying times and locations of image data of cameras for vehicles. The method for verifying times and locations of image data of
(Continued)

cameras for vehicles includes anonymously receiving digests including locations and times of data created by cameras for a plurality of vehicles, respectively, forming a mesh structure by bi-directionally connecting the cameras for the plurality of vehicles to cameras for adjacent vehicles, based on a relationship between the received digests, and if the mesh structure is formed, verifying times and locations for the digests constituting the mesh structure based on the formed mesh structure.

5 Claims, 9 Drawing Sheets

(51) Int. Cl.
*H04W 48/10* (2009.01)
*H04W 12/02* (2009.01)
*H04W 4/46* (2018.01)
*H04W 84/18* (2009.01)
*G08G 1/04* (2006.01)
*G08G 1/00* (2006.01)
*H04W 64/00* (2009.01)
*H04W 4/029* (2018.01)

(52) U.S. Cl.
CPC ........ *B60Y 2400/3015* (2013.01); *G08G 1/04* (2013.01); *G08G 1/205* (2013.01); *H04W 4/029* (2018.02); *H04W 4/46* (2018.02); *H04W 64/006* (2013.01); *H04W 84/18* (2013.01)

(56) References Cited

U.S. PATENT DOCUMENTS

| | | | | |
|---|---|---|---|---|
| 9,403,482 | B2* | 8/2016 | Shahraray | H04W 4/70 |
| 10,057,604 | B2* | 8/2018 | Von Novak | H04N 21/2187 |
| 2007/0038567 | A1* | 2/2007 | Allaire | G06Q 30/0239 |
| | | | | 705/50 |
| 2009/0231432 | A1* | 9/2009 | Grigsy | G08G 1/161 |
| | | | | 348/149 |
| 2010/0284384 | A1* | 11/2010 | Stahlin | H04W 76/40 |
| | | | | 370/338 |
| 2010/0303048 | A1* | 12/2010 | Stahlin | H04W 84/12 |
| | | | | 370/338 |
| 2011/0098877 | A1* | 4/2011 | Stahlin | G08G 1/161 |
| | | | | 701/31.4 |
| 2011/0128902 | A1* | 6/2011 | Guo | G08G 1/161 |
| | | | | 370/312 |
| 2011/0177791 | A1* | 7/2011 | Stahlin | B60R 25/102 |
| | | | | 455/404.2 |
| 2011/0246594 | A1* | 10/2011 | Cobbold | G06Q 10/10 |
| | | | | 709/206 |
| 2014/0253732 | A1* | 9/2014 | Brown | G06T 7/80 |
| | | | | 348/159 |
| 2016/0294839 | A1* | 10/2016 | Walline | G06F 16/23 |
| 2016/0373971 | A1* | 12/2016 | Kulal | H04W 24/02 |

OTHER PUBLICATIONS

International Search Report (with English Translation), dated Oct. 18, 2016, for PCT/KR2016/007877, 5 pages.

* cited by examiner

(a) Two individual attackers.

(b) Four colluding attackers.

METHOD AND APPARATUS FOR VERIFYING TIME AND LOCATION OF IMAGE DATA OF CAMERA FOR VEHICLE WHILE ANONYMITY OF OWNER IS GUARANTEED

TECHNICAL FIELD

The present invention relates to a technology of verifying a time and a location of image data of a camera for a vehicle, and more particularly, to a method and an apparatus for verifying a time and a location of image data for a vehicle while the anonymity of the owner is guaranteed.

BACKGROUND ART

A dash cam is an onboard camera that continuously records a view through a front window of a vehicle, and continuously records segments for a unit time and stores the segments through an onboard SD memory card.

The dash cams have become more popular particularly in most countries of Asia and Russia, and people install dash cams in their vehicles to protect them from accidents. Because video proofs that cannot be refuted may be acquired from traffic accident events. For example, the insurance companies provide discounts as an insurance policy if the users install dash cams in their vehicles to recommend the uses of the dash cams.

The dash cams have potential capabilities of using silent observers of other accidents. For example, the police requests submittal of a dash cam captured at a specific accident site and if the accident is verified, provides a reward. However, people hesitate to provide a dash cam video because their location histories may be exposed, while their privacies are not guaranteed. This is because the users desire to protect their location privacies unlike that the police desire to verify the locations and times of the DCVs. Accordingly, an automation process for verifying the locations and times of DCVs while the anonymity of the users are guaranteed is required.

For the related technologies, many studies on verification of location as well as location privacy have been made, and the existing location verification technique aims to discover the location of a user or determine the legitimacy of the location of the user. The existing location verification technique verifies location in various schemes. For example, location is verified by using ultrasonic communication or using multi-lateralization through an intra-structure, such as a base station or sensor nodes, or a directional antenna. However, the methods verify a location of the user, and the location privacy of the user is not guaranteed.

Further, the existing location privacy method is focused in hiding the identity of the user while using a location based service. The existing location privacy method realizes location privacy by using various schemes, such as k-anonymity, a mixed zone, or a predictable privacy. However, the existing location privacy method may protect the location history of the user, but it is difficult to apply the method to verification of location.

Further, as a possible method for protecting the location privacy of the user, there is a method for anonymously submitting a DCV including GPS based location and time information. However, according to the method, because the GPS information may be easily faked, the actual location and time of the submitted DCV cannot be verified.

Accordingly, the necessity of a measure for verifying the time and location of image data of a camera for a vehicle, such as a DCV while guaranteeing the anonymity of the user has risen.

DETAILED DESCRIPTION OF THE INVENTION

Technical Problem

Embodiments of the present invention provide a method and an apparatus for verifying a time and a location of image data of a camera for a vehicle, by which the time and location of the image data of the camera for the vehicle may be verified while the anonymity of the user is guaranteed.

Technical Solution

In accordance with an aspect of the present invention, there is provided a method for verifying times and locations of image data of cameras for vehicles, the method including anonymously receiving digests including locations and times of data created by cameras for a plurality of vehicles, respectively, forming a mesh structure by bi-directionally connecting the cameras for the plurality of vehicles to cameras for adjacent vehicles, based on a relationship between the received digests, and if the mesh structure is formed, verifying times and locations for the digests constituting the mesh structure based on the formed mesh structure.

The receiving of the digests may include receiving a digest of a camera for a host vehicle and the digests received from cameras for adjacent surrounding cameras from the cameras for the plurality of vehicles, by broadcasting the digests of the data created by the cameras for the plurality of vehicles to the cameras for the adjacent surrounding vehicles and by receiving digests broadcast from the cameras for the surrounding vehicles The receiving of the digests may include anonymously receiving the digests from the cameras for the plurality of vehicles, by changing predetermined numbers of first bits of digest messages to source MAC addresses of the cameras of the plurality of vehicles by the cameras of the plurality of vehicles.

The forming of the mesh structure may include forming the mesh structure, by searching for a predetermined trusted digest, of the received digests, which is closest to a preset location and by creating an edge between bi-directional adjacent digests by using the discovered trusted digest and the digests corresponding to the preset location.

The verifying of the times and the locations may include verifying the times and the locations for the digests corresponding to the preset location, by evaluating trust scores for the digests corresponding to the preset location based on a trust score of the trusted digest and by determining legitimacies of the digests corresponding to the preset location based on the evaluated trust score.

The verifying of the times and the locations may include verifying the times and the locations for the digests corresponding to the preset location, by determining participations of the digests constituting the mesh structure by exchange of digests with the cameras for the surrounding vehicles and by determining a digest that participates by the exchange of the digests as a legitimate digest.

In accordance with another aspect of the present invention, there is provided a system for verifying times and locations of image data of cameras for vehicles, the system including cameras for a plurality of vehicles configured to create digests including locations and times of data, transmitting the created digests to cameras for surrounding vehicles, receiving digests transmitted from the cameras for the surrounding vehicles, and uploading a digest of a camera for a host vehicle and the received digests, and a server configured to anonymously receive digests that are uploaded by the cameras for the plurality of vehicles, form a mesh structure by bi-directionally connecting the cameras for the plurality of vehicles to cameras for adjacent vehicles based on a relationship between the received digests, and verify times and locations for the digests constituting the mesh structure based on the formed mesh structure.

In accordance with another aspect of the present invention, there is provided an apparatus for verifying times and locations of image data of cameras for vehicles, the apparatus including a reception unit configured to anonymously receive digests including locations and times of data created by cameras for a plurality of vehicles, respectively, a formation unit configured to form a mesh structure by bi-directionally connecting the cameras for the plurality of vehicles to cameras for adjacent vehicles, based on a relationship between the received digests, and a verification unit configured to, if the mesh structure is formed, verify times and locations for the digests constituting the mesh structure based on the formed mesh structure.

The reception unit may receive a digest of a camera for a host vehicle and the digests received from cameras for adjacent surrounding vehicles from the cameras for the plurality of cameras, by broadcasting the digests of the data created by the cameras for the plurality of vehicles to the cameras for the adjacent surrounding vehicles and by receiving digests broadcast from the cameras for the surrounding vehicles.

The reception unit may anonymously receive the digests from the cameras for the plurality of vehicles, which are obtained by changing predetermined numbers of first bits of digest messages to source MAC addresses of the cameras of the plurality of vehicles by the cameras of the plurality of vehicles.

The formation unit may form the mesh structure, by searching for a predetermined trusted digest, of the received digests, which is closest to a preset location and by creating an edge between bi-directional adjacent digests by using the discovered trusted digest and the digests corresponding to the preset location.

The verification unit may verify the times and the locations for the digests corresponding to the preset location, by evaluating trust scores for the digests corresponding to the preset location based on a trust score of the trusted digest and by determining legitimacies of the digests corresponding to the preset location based on the evaluated trust score.

The verification unit may verify the times and the locations for the digests corresponding to the preset location, by determining participations of the digests constituting the mesh structure by exchange of digests with the cameras for the surrounding vehicles and by determining a digest that participates by the exchange of the digests as a legitimate digest.

In accordance with another aspect of the present invention, there is provided a method for verifying times and locations of image data of cameras for vehicles, the method including anonymously receiving profiles including locations and times of data created by cameras for a plurality of vehicles, respectively, forming a map structure by bi-directionally connecting the cameras for the plurality of vehicles to cameras for adjacent vehicles, based on a relationship between the received profiles, and if the map structure is formed, verifying times and locations for the profiles constituting the map structure based on the formed map structure.

The profiles may include digests that are hash values in unit of a specific time.

In accordance with another embodiment of the present invention, there is provided a system for verifying a time and a location of image data of a camera of a vehicle, the system including cameras for a plurality of vehicles configured to create profiles including locations and times of data, transmitting the created profiles to cameras for surrounding vehicles, receiving profiles transmitted from the cameras for the surrounding vehicles, and uploading a profile of a camera for a host vehicle and the received profiles, and a server configured to anonymously receive profiles that are uploaded by the cameras for the plurality of vehicles, form a mesh structure by bi-directionally connecting the cameras for the plurality of vehicles to cameras for adjacent vehicles based on a relationship between the received profiles, and verify times and locations for the profiles constituting the mesh structure based on the formed mesh structure.

Advantageous Effects of the Invention

According to embodiments of the present invention, by exchanging digests including times and locations data of cameras for a plurality of vehicles while anonymity between the cameras is guaranteed and forming a mesh structure by using the digests, time and location may be verified while the anonymity of the users is guaranteed for the digests constituting the mesh structure.

According to embodiments of the present invention, by using a data orienting technique that uses the digests created by data of the cameras for vehicles, instead of the identities of the users, time and location may be verified while the anonymity of the users is guaranteed.

Therefore, according to embodiments of the present invention, even for data created by the cameras for vehicles as well as the DCVs created by the dash cams of the vehicles, time and location may be verified while the anonymity of the users is guaranteed.

BEST MODE

Hereinafter, exemplary embodiments of the present invention will be described in detail with reference to the accompanying drawings. However, the present invention is neither limited nor restricted by the embodiments. Further, the same reference numerals in the drawings denote the same members.

Embodiments of the present invention aim to provide a solution for verifying time and location while the anonymity of a user is guaranteed, for data created by a camera for a vehicle.

Here, Embodiments of the present invention suggest a data oriented technique for verifying the time and location of data by using only data of a camera for a vehicle, and through this, the time and location of the data may be verified while the privacy of the user is guaranteed.

Embodiments of the present invention form a mesh structure by using a digest including the time and location of image data of a camera for a vehicle and suggest a random-walk based location verification algorithm on the mesh.

Hereinafter, for convenience of description, a detailed description of the present invention will be limited such that time and location may be verified while the anonymity of a user is guaranteed for a dash cam video (DCV) captured by a dash cam of a vehicle. Of course, the present invention is not limited to a dash cam, and for data created by all cameras for vehicles, such as a black boxes, smartphones, or Google glasses, which may exchange digests through short-range communication, for example, dedicated short-range communication with cameras for adjacent vehicles, the time and location of the created data may be verified while the anonymity of the users of the cameras for vehicles is guaranteed.

The present invention may consider a proof search system that is potentially operated by the legitimate authority. For example, when the police investigate an accident that occurred in the past, for example, a few days ago, the police desire to collect dash cam videos (DCV) captured by vehicles located at a traffic accident location at a time at which the traffic accident occurs and provides rewards for the collected DCVs to the owner of the DCVs.

All vehicles may obtain their locations and times through the GPS, and a malicious user may assert compensation for a fake DCV that fakes the location and/or time of the vehicle if the fake DCV is not verified because the information is verified at a GPS-based location. Human checking of directly identifying DCVs by the investigator is helpful for identifying fake DCVs, but the manual review of a large amount of fake DCVs is impractical. For example, because the attackers may submit a very large amount of fake DCVs with an intention of disturbing the system, the identification of the DCVs through human checking is very impractical.

Meanwhile, verification of the locations and times of the DCVs may violate the location privacies of the users, and the existing method is mostly based on the identities of the users or the identities of the devices and the users are associated with their locations. This decreases participations of users due to a problem of exposing the privacies of the users.

Accordingly, the present invention provides a verification solution that is automated while the anonymity of the users is guaranteed. Here, according to the anonymity characteristics, no one may link image data of the cameras for vehicles to their owners. This means that the users may preserve location privacies when the users provide DCVs.

Here, the automated verification may filter fake DCVs that assert fake locations and fake times. That is, the present invention automatically identifies legitimate DCVs by using automated verification, and the human inspector may review only DCVs for analyzing a traffic accident.

The method and apparatus according to embodiments of the present invention provide an automated verification framework that guarantees the anonymity of the users for the DCVs.

Embodiments of the present invention provide a verification framework by using only image data of cameras for vehicles, and hereinafter, a verification framework that provides by using a digest related to a DCV will be defined a view mesh.

The view mesh in the present invention deals with a DCV itself with a verification entity. For a given DCV, a view mesh may determine the legitimacy of the location and time of the owner without using information on the owner, and each DCV, for example, a one-minute footage may be expressed in a compact form called a view digest VD having an asserted location and time.

Each VD has a strong relationship with another VD that is adjacent in a space and at a time through dedicated short-range communication (DSRC). All the users anonymously upload their VDs (here, the VDs are not original DCVs) on the system, and the VDs uploaded on the system are used for verification.

Here, the system may correspond to a device for verifying a time and a location of image data of a camera for a vehicle equipped with a verification solution.

The main features of the view mesh are that a verification process discover fake VDs through a legitimate VD, and the fake VD may be identified with the help of an ample number of legitimate VDs and several trusted VDs (for example, a police car).

Then, the legitimate VD and the trusted VD may be strongly combined with each other in a structure such as a mesh. If the VDs of the users are verified by the view mesh, the users anonymously submit the original DCVs.

The data orienting technique of guaranteeing the anonymity of the present invention is to separate the location problem and the location privacy, and the identities of the owners are not opened because the view mesh deals with only the locations and times of the VDs. The present invention is different from an existing method of verifying the location of a user, of which the location privacy is not guaranteed, and authenticating the ownership of the data of the user, and the anonymity of the user may be guaranteed.

The framework of the present invention will be described as follows.

The view mesh of the present invention includes three elements of exchange of VDs, construction of a view mesh, and verification of VDs in sequence at a high level, and the three elements will be described.

(1) Exchange of VDs

Each vehicle creates a VD including an area, a time, a hash, and the like for a current scene of a dash cam, and periodically broadcasts the most recent VDs to the adjacent vehicles by using DSRC.

Figure 1:
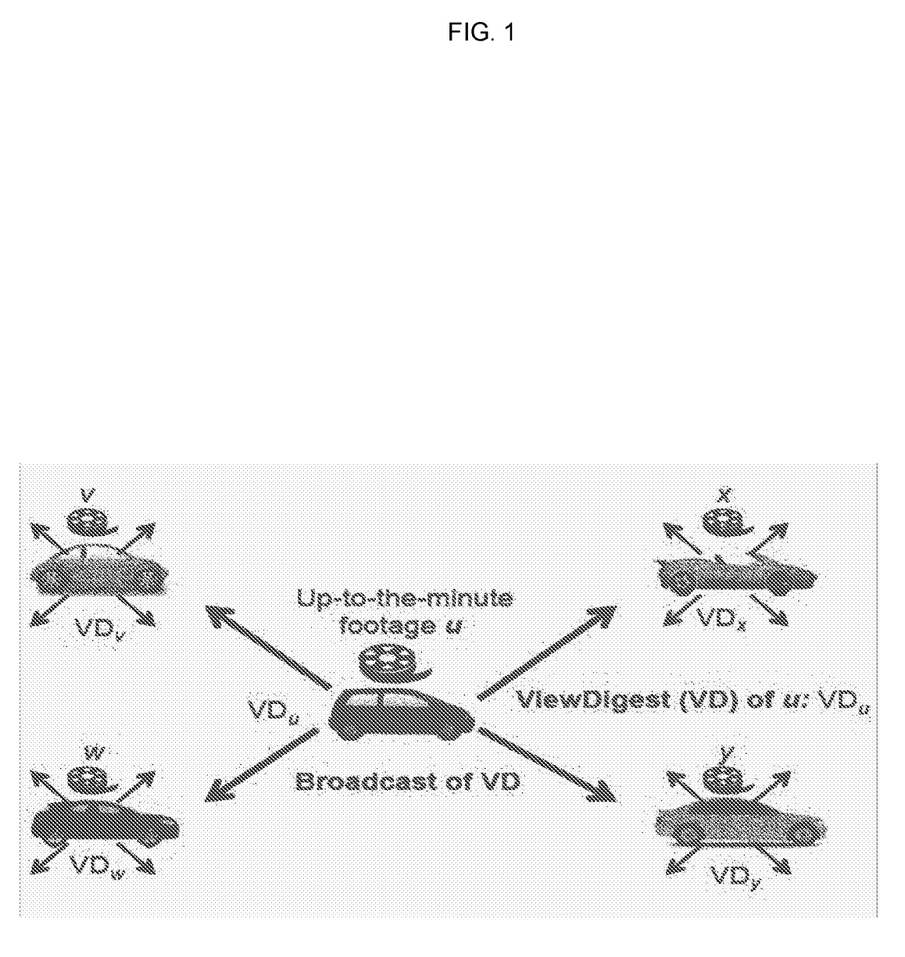
FIG. 1 illustrates an exemplary view for explaining exchange of VDs.

Each vehicle identifies the received VD and accepts the received VD as its neighbor. For example, in FIG. 1, VDv and VDu are adjacent to each other in space and time, and similarly, VDu and VDw, VDu and VDx, and VDu and VDy are adjacent to each other in space and time.

The DCVs consistently recorded by the dash cams of the vehicles are sequentially stored in separated chunks including unit time scenes, and the vehicles maintain tracks of their most recent scenes u, and make VDs of u. Further, each vehicle A periodically broadcasts a current VDu as in Equation 1 by using dedicated short-range communication.

$$A\text{->*}: T_U, L_U, H(T_U|L_U|Q_U|u), R_U \qquad \text{[Equation 1]}$$

Here, Tu may refer to a start time of a scene u, Lu may refer to a start location of u, Qu may refer to a unique number related to u, and Ru may refer to a bit array that expresses VDs received from other vehicles for a period, and the bit array may be a bit array by a bloom filter.

Qu and the screen u may not be exposed in VDu, and may be provided to the system after VDu is verified, and the scene u may be a screen u in a hash H.

Then, the value Qu itself is related to the authority of ownership, may be derived from Qu=H(Su), and Su is a secret number of u selected by vehicle A and may be used for compensating anonymity later.

Further, each vehicle A receives a broadcast message of VDv from vehicle B that is adjacent to or close to Vehicle B as in Equation 2.

$$B\text{->*}: T_v, L_v, H(T_v|L_v|Q_v|v), R_v \qquad \text{[Equation 2]}$$

Here, Tv and Lv refer to a start time and a start location of a scene v.

Vehicle A inspects validity by whether checking Tv and Lv are within an acceptable range if receiving VDv from an adjacent vehicle. That is, the validity is inspected by checking whether Tv is within a current one-minute interval, Lv is within a radius of XA meter, and XA is within a current average speedxa unit time of vehicle A. If the check result is valid, vehicle A inserts VDv (except for Rv) into a bloom filter bit-array as in Equation 3.

$$T_v, L_v, H(T_v|L_v|Q_v|v) \text{-->} R_U \qquad \text{[Equation 3]}$$

bloom filter
insert

The updated Ru may be used in a VDu broadcast message later and Vehicle A may inspect whether VDv listens to or receive VDu, and to achieve this, a membership query may be performed on Rv as in Equation 4.

$$T_U, L_U, H(T_U|L_U|Q_U|u), RU \text{-->} R_v \qquad \text{[Equation 4]}$$

bloom filter
Member?

If a bi-directional link is identified, VDu regards VDv as a neighbor, and to achieve this, vehicle A inserts VDv (except for Rv) into Nu.

Here, Nu refers to a bit-array by a bloom filter that expresses an identified neighbor of VDv. That is, the members of Nu is a subset of members of Ru, and Nu replaces Ru later if VDv is not the current VD any more.

The present invention may hide a source MAC address of a VD broadcast message to make a VD exchange process completely anonymous, and the adjacent vehicles may associate the received VD with the source MAC address of the message if the source MAC address is not hidden, which may cause a danger of exposing user information as well as the ID of the vehicle.

Accordingly, a VD message is transmitted to the outside, each vehicle fills a 48-bit DSRC source MAC address field with the first 48-bits of the current VD broadcast message and accordingly, a link between a VD and its owner may be broken in a wireless communication range. Because the VD broadcast cannot be authenticated unlike another VANET application such as a road safety message, masquerading of the MAC address may be accepted.

The VD exchange operation including the masquerading of the MAC address may be realized in a DSRCb OBU test bed.

(2) Construction of View Mesh

The user submits his or her VD and a neighbor's VD to the system or the verification server in a compact format by a bloom filter, and when an investigation is required, the system creates a set of view meshes corresponding to a single time unit, for example, one minute in an accident period.

Then, each vehicle may individually transmit a relationship between adjacent vehicles and a VD to the system through an anonymous channel.

The construction of view meshes requires bi-directional connections of all adjacent VDs, and each view mesh covers an area including an investigation area and a location of a trusted VD.

In detail, all VDs that may be potentially used as a proof whenever the vehicles are connected to a network are anonymously uploaded on the system. For example, vehicle A submits VDu to the system S as in Equation 5.

Anonymous $$A \text{-->} S\ T_U, L_U, H(T_U|L_U|QU|u), N_U \qquad \text{[Equation 5]}$$

transfer

Here, Nu refers to a bit array that represents a neighbor of VDu.

The user may anonymously upload a VD message on the system by using an online tool, for example, Tor. For example, the present invention may utilize a smartphone of the user in which a Tor client application is installed as a breezing device for delivering a VD from a dash cam to the system, and may utilize a smartphone of the user in which a Tor client application is installed, and the system accumulates the VPs anonymously submitted from the users.

The system creates sets of view meshes corresponding to a unit time, for example, one minute in an accident period for a required investigation. Here, the view meshes are independent from each other according to a time dimension.

Accordingly, hereinafter, construction of a single view mesh constructed while having only a VD that is in a time t from any one-minute time interval t will be described.

When an investigation is required, the system searches for trusted VDs that are closest to a corresponding investigation location I. Here, the trusted VDs may refer to VDs, such as a police car or a special VD, which are determined or defined in advance. All the VDs are located in a circular area including the investigation location I, and the VDs are members of view meshes.

The system searches for adjacent candidates VDv, of which locations Lu and Lv of the leaders of the members are within a predetermined distance Δ from the members VDu.

Here, Δ refers to a maximally allowable distance in a unit time.

Mutual neighboring between VDu and VDv is validated through a membership query for Nv and Nu, and a view mesh is formed, that is, constructed by creating an edge between bi-directional adjacent VDs in this way.

(3) Verification of VD

If a view mesh for a location of investigation is given through construction of a view mesh, the system uses unique features of a VD link structure to discover a fake VD. To achieve this, the system may evaluate trust cores for all members VDs, and in order to evaluate the trust scores, the system may apply a specific algorithm, for example, a trust rank algorithm to the view mesh.

In the view mesh, the trust VD, for example, a police car functions as a ground-truth node, and the system identifies a legitimate VD from a fake VD based on a trust score result according to a topology of the view mesh.

Figure 2:
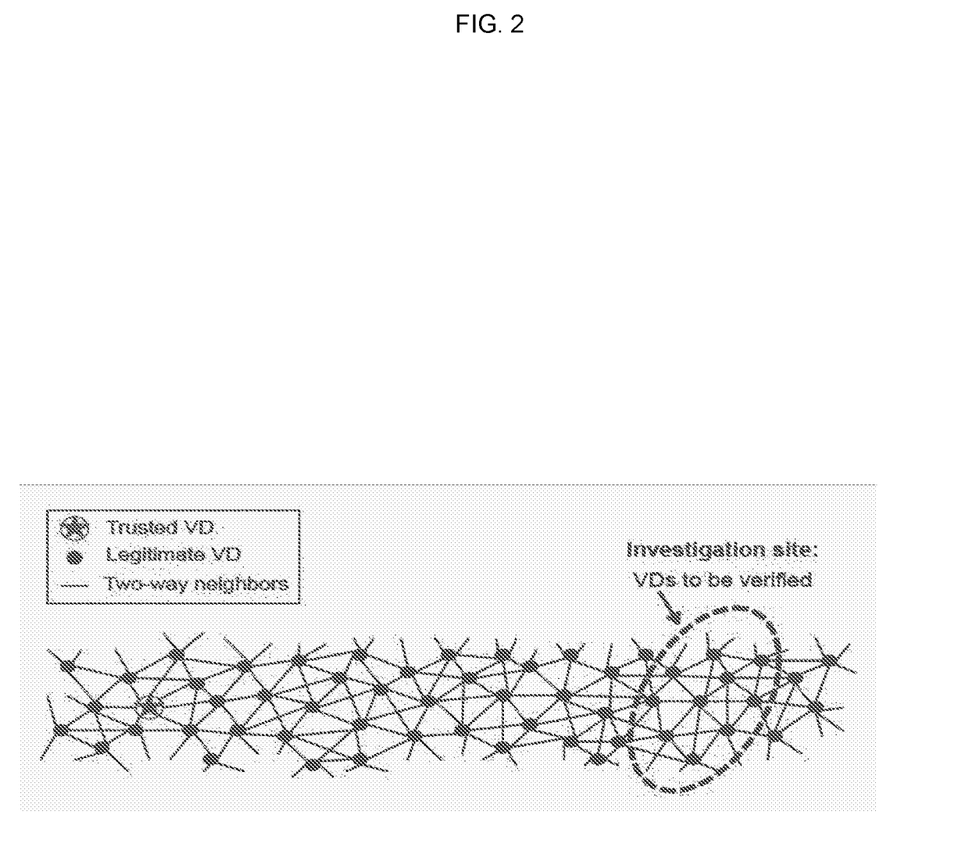
FIG. 2 illustrates an exemplary view of a view mesh having legitimate VDs.

In detail, as illustrated in an example of FIG. 2, if the constructed view mesh is given, the system determines whether the VDs in the investigation location are legitimate.

For example, the system may identify the VDs as legitimate VDs when the VDs participate in the view mesh through exchange of VDs, and otherwise, may identify or determine the VDs as fake VDs. Here, the legitimacy relates not to contents but to a location and a time of a VD, and validates the location and the time of the corresponding VD. The verification solution, that is, the view mesh according to the present invention may help a human investigator who directly identifies a VD by automatically identifying the legitimate VD.

Figure 3:
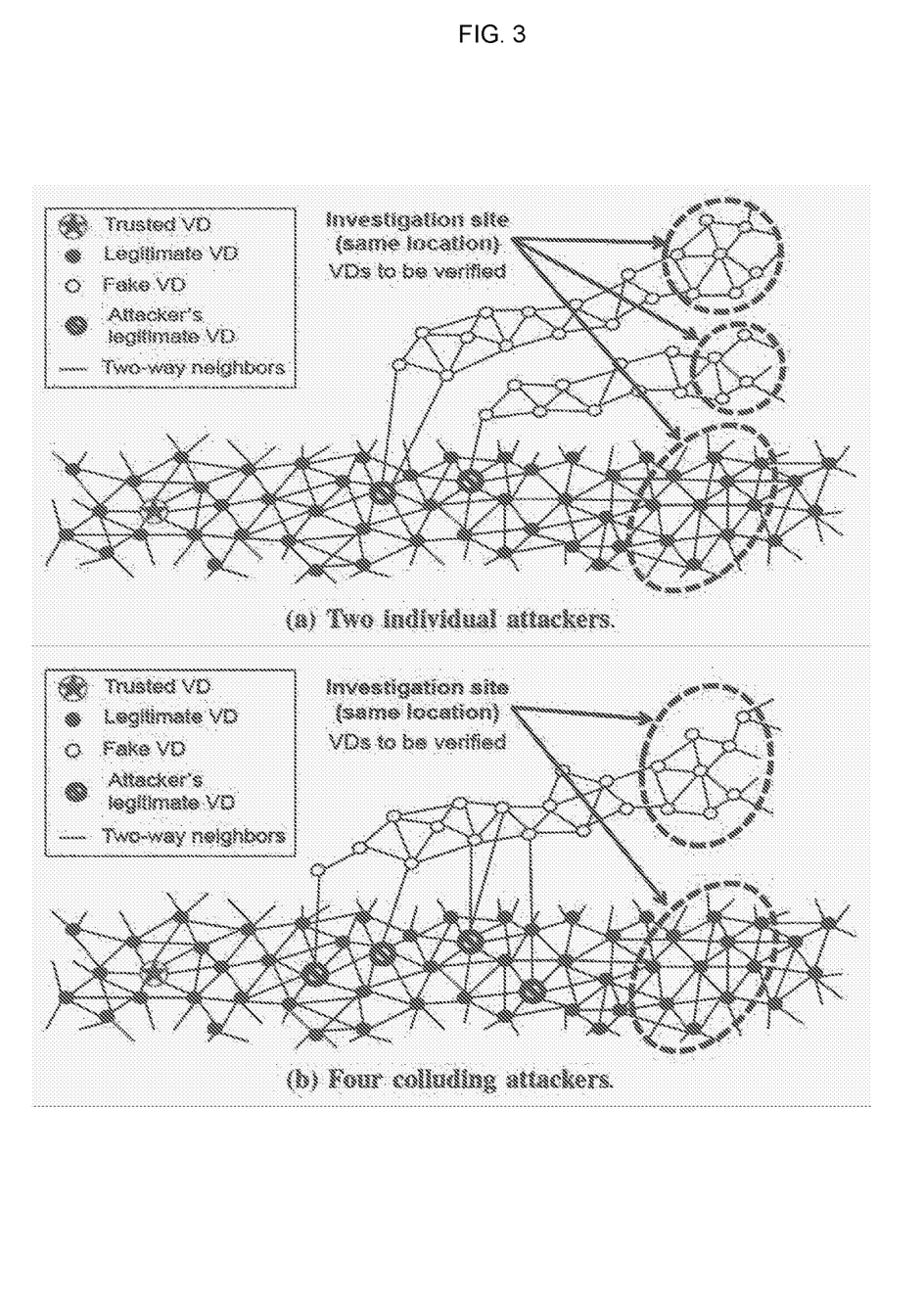
FIG. 3 illustrates an exemplary view of view meshes having fake VDs.

The constructed view mesh may appear as a single layer as illustrated in FIG. 2 when all the members are legitimate VDs, and may result in a multi-layer structure as illustrated in FIG. 3 when the members have a fake VD and may have one layer of the multi-layers, which includes a trusted VD.

A multi-layer structure appears when the view mesh is constructed to include a fake VD because the attackers are prevented from making edges between fake VDs and legitimate VDs without substantial exchange of VDs by validation of bi-directional links. Therefore, the attackers may insert fake VDs by simply linking them to a legitimate VD. Moreover, location close checking of adjacent VDs disenables long-distance edges, and accordingly, the attackers compulsorily create chains of fake VDs to position some of the fake VDs at a target location as illustrated in FIG. 3.

A main point of the multi-layer view mesh illustrated in FIG. 3 is that VD links are more densely distributed than a cross layer link in the single layer. In an example of FIG. 3, if a source is started from a trusted VD VDz, it moves at random along an edge from the view mesh. For a given investigation location X, a probability of visit of a VD at X of a layer of z, that is, a legitimate VD is higher than a probability of visit of a VD at X of other layers, that is, a fake VD, and this is because at X, visit of a fake VD requires a random walk to review a cross layer edge from a legitimate VD of a specific attacker.

To use a random work in a link structure of a view mesh, the present invention uses a specific algorithm, for example, a trust rank algorithm. The trust rank algorithm is a modification of a well-known page rank, and distribution of probabilities of likelihood of starting from a seed page and reaching a specific page is output when a person clicks at random on a link. In this case, as a seed page, the trusted VD has a probability (trust score) of 1, and the score is equally divided to all adjacent links and is distributed to other adjacent VDs. The repetitions of the process propagate the trust score to all the VDs corresponding to a random walk on a view mesh.

Then, by the trust rank algorithm, the trust scores P of all the VDs may be calculated through repetitions of a matrix operation illustrated in Equation 6 for a given view mesh G.

$$P=\alpha*M*P+(1-\alpha)*d \quad \text{[Equation 6]}$$

Here, M refers to a transition matrix that represents a VD link of a view mesh G, d refers to a trust score distribution vector having an entry for a trusted VD, and a refers to a set damping factor. Then, the trust score may be obtained through convergence of P.

A process of identifying a legitimate VD by the system will be described as follows.

If a trust VDz and an investigation location X are given, the VDs at X of a z layer have higher trust scores than the VDs at X of another layer. This is particularly valid when the number of the frank users is much larger than the number of the attackers, and this is because the random walk has more opportunities of using edges in a basic layer of z than when a cross layer edge is used.

Further, the undirected edges in the view mesh may move bi-directionally so that even a crossed edge may make an opportunity of staying in another weak layer. That is, the undirected edges may move again as a basic layer. Accordingly, the system identifies a highest trust score VDu as a legitimate VD.

Then, the system also may determine all VDs that may reach u through the VDs of X as legitimate VDs. The actual values of the legitimate VDu may be reviewed by a human investigator when the user anonymously provides an original scene u and a unique number Qu. Because VDu includes H(Tv|Lv|Qv|v), the truth of a screen u as well as the ownership may be validated through Qu without the identity of the user. Qu may be derived from Qu-H(Su), and Su is a secret number for u selected by the user and may be used for compensating for anonymity later.

As described above, the verification framework according to the embodiment of the present invention may verify a location and a time of image data of a camera of a vehicle while guaranteeing the anonymity of the user through exchange of VDs, construction of a view mesh, and verification of the VD using them.

Figure 4:
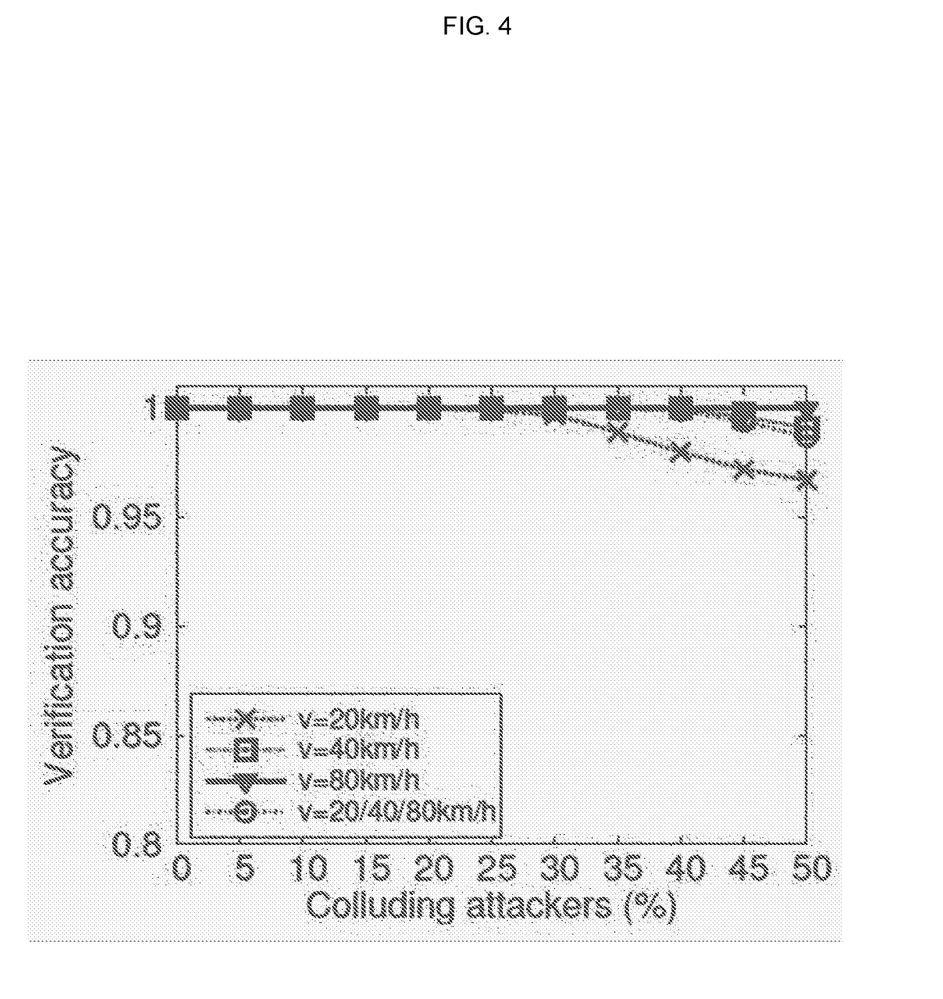
FIG. 4 illustrates an example of an evaluation result of a verification accuracy according to a ratio of colluding attackers.

In the embodiment of the present invention, as can be seen through FIG. 4 illustrating an evaluation result of verification accuracies according to the ratio of colluding attackers and the speeds of the vehicle, a verification accuracy of almost 97% is shown in a view mesh of the speed of the vehicle of 40 km/h and a view mesh of the speed of the vehicle of 80 km/h and the verification accuracy of not less than 95% is shown in view mesh modes of 20 km/h, 40 km/h, and 80 km/h even though the ratio of the colluding attackers is close to 50%.

In this way, in the embodiment of the present invention, the time and location of data may be verified while the anonymity of user is guaranteed by using a data orienting technique of image data of a camera for a vehicle, and accordingly, it is easy to collect image data of a camera for a vehicle, such as a DCV, by providing the verification frame work of the present invention.

Further, the embodiments of the present invention may have the following main advantages.

First, the data location verifying problem may be separated from the privacy of the user by using the data orienting technique of effectively separating the location problem from the location privacy issue, and accordingly, image data of a camera for a vehicle of the user may be provided to the user without concerns about the location privacy.

Second, practical DCD verification framework leveraging dedicated short-range communication (DSRC) may be designed, and each vehicle makes a DCV having a strong relationship with another adjacent DCV at a location and a time through the dedicated short-range communication and a structure such as a mesh may be formed in a large scale.

Third, a high verification accuracy of about 95% or more is shown even though attackers who submit fake DCVs that fake location and time occupy a percentage of about 30% or more, through a performance evaluation result of a view mesh through a measurement of a field on the actual road that uses a DSRC test bed as well as a traffic trace based simulation.

Figure 5:
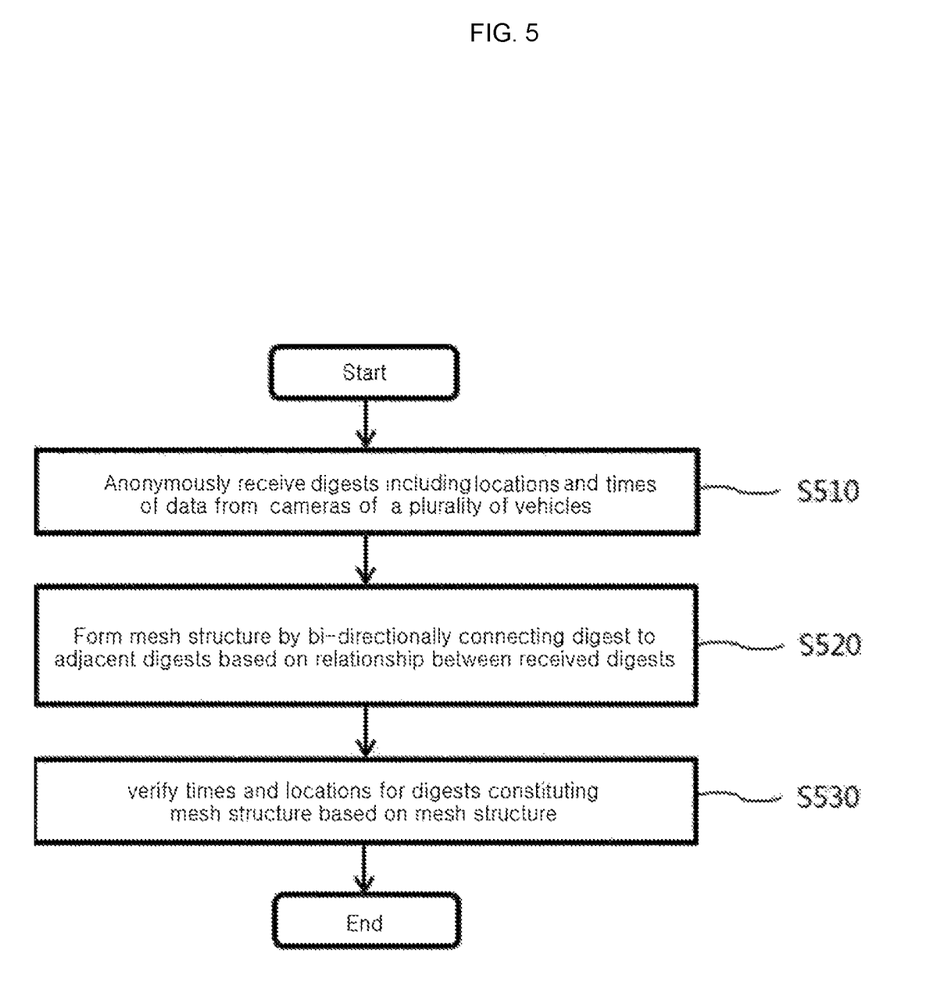
FIG. 5 illustrates an operation flowchart of a method for verifying a time and a location of image data of a camera for a vehicle according to an embodiment of the present invention.

FIG. 5 illustrates an operation flowchart for the method according to the embodiment of the present invention, and all of the exchange of VDs, construction of a VD, and verification of a VD are performed.

Referring to FIG. 5, the method according to the embodiment of the present invention includes an operation (S510) of anonymously receiving digests including locations and times of data created by cameras for a plurality of vehicles, respectively, an operation (S520) of forming a mesh structure by bi-directionally connecting the cameras for the plurality of vehicles to cameras for adjacent vehicles, based on a relationship between the received digests, and an operation (S530) of if the mesh structure is formed, verifying time and location for the digests constituting the mesh structure based on the formed mesh structure.

In operation S510, the digests are received from the cameras for vehicles by exchanging digests with the cameras for adjacent vehicles by the cameras for the vehicles and by providing the exchanged digests and the digest of the camera for a host vehicle to the system or sever that performs the method of the present invention.

In detail, in operation S510, the digests received from the digest of the camera for the host vehicle and the digests received from the cameras for the surrounding vehicles may be received from the cameras for the plurality of vehicles by broadcasting the digests of the data created by the cameras for the plurality of vehicles to the cameras for the adjacent surrounding vehicles and by receiving the broadcast digests from the cameras for the surrounding vehicles.

Then, for the digests received in operation S510, in order to guarantee anonymity, the cameras for the plurality of vehicles may change a predetermined number of first bits, for example, 48 bits of the digest message to source MAC addresses of the cameras for the plurality of vehicles. That is, in operation S510, the digests, of which anonymities are guaranteed, may be received by masquerading of MAC addresses performed by the cameras for the vehicles.

In operation S520, the mesh structure for a set of meshes by creating the set of meshes corresponding to a specific accident and bi-directionally connecting all adjacent digests using the created set of meshes.

Then, in operation S520, the mesh structure corresponding to a specific location may be formed by, when an investigation for a specific location is required, searching for a trusted digest of the received digests, which is closest to the specific location that is required to be investigated and by creating bi-directional edges between adjacent digests by using the discovered trusted digest and the digests corresponding to the specific location. That is, in operation S520, the mesh structure is formed by validating mutual neighbors between adjacent digests and by creating bi-directional edges between digests.

In operation S530, times and locations for the digests corresponding to the specific location that is required to be investigated is verified by determining participation of the digests constituting the mesh structure by the exchange of digests with the cameras for the surrounding vehicles and by determining the digest that participates through the exchange of the digests as a legitimate digest and determining the digest as a fake digest otherwise.

Further, operation S530, the times and locations for the digests corresponding to the specific location that is required to be investigated may be verified by evaluating trust scores for the digests that form the mesh structure and determining legitimacy for the digests based on the evaluated trust scores.

Then, the trust score for the digests constituting the mesh structure based on the trust score of the trust digest, for example, 1, and the trust score may be evaluated by a specific algorithm, for example, a trust rank algorithm. Of course, in the present invention, the algorithm for evaluating a trust score is not limited to a trust rank algorithm, and may include all algorithms that may evaluate the trust score.

Figure 6:
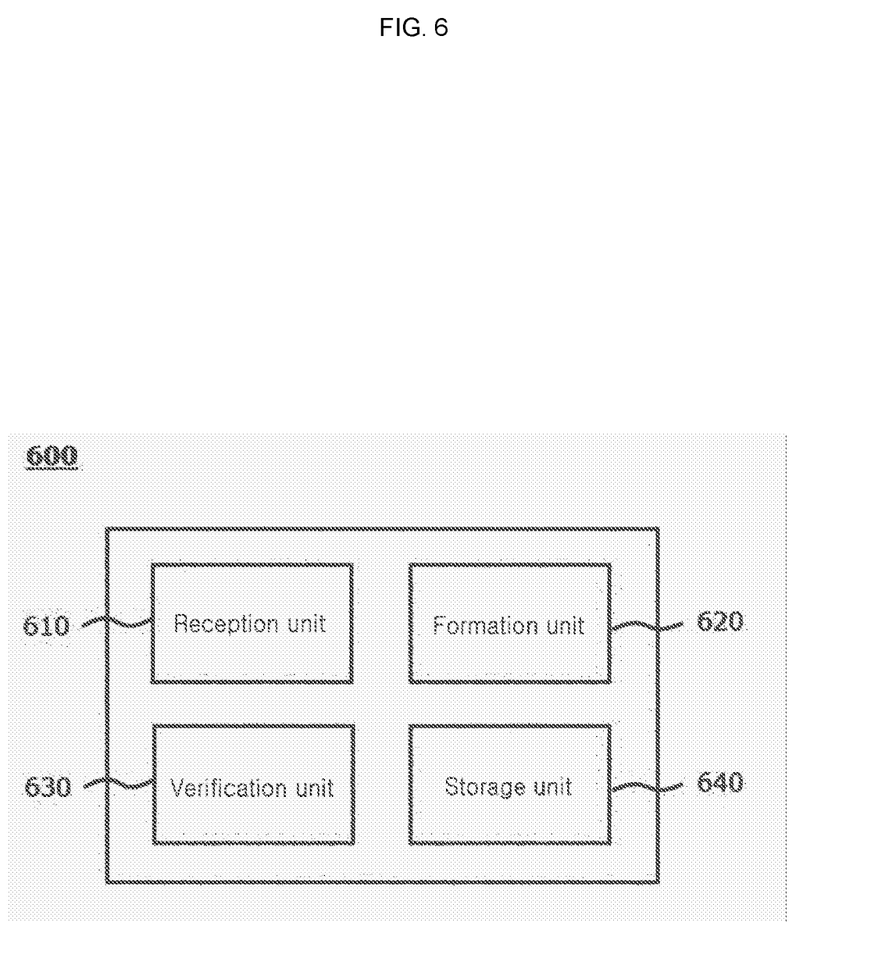
FIG. 6 illustrates an operation flowchart of an apparatus for verifying a time and a location of image data of a camera for a vehicle according to an embodiment of the present invention.
Figure 7:
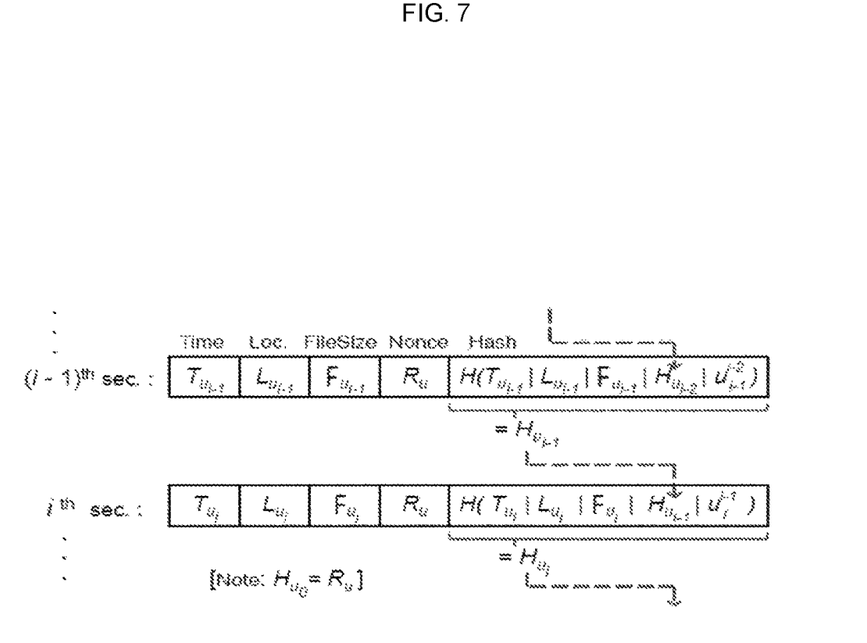
FIG. 7 illustrates an exemplary view of VDs of a video u recorded currently.

FIG. 6 illustrates a configuration of an apparatus for verifying a time and a location of image data of a camera for a vehicle according to an embodiment of the present invention, and illustrates a configuration of a system or server that performs FIGS. 1 to 5.

Referring to FIG. 6, the apparatus 600 according to the embodiment of the present invention includes a reception unit 610, a formation unit 620, a verification unit 630, and a storage unit 640.

The reception unit 610 anonymously receives digests including locations and times of data created by cameras for a plurality of vehicles, respectively.

Then, the reception unit 610 may receive the digests received from the digest of the camera for the host vehicle and the digests received from the cameras for the surrounding vehicles from the cameras for the plurality of vehicles by broadcasting the digests of the data created by the cameras for the plurality of vehicles to the cameras for the adjacent surrounding vehicles and by receiving the broadcast digests from the cameras for the surrounding vehicles.

Then, the reception unit 610 may receive the digests, of which the anonymity is guaranteed, from the cameras for the plurality of vehicles by performing masquerading of a MAC address for changing a predetermined number of first bits, for example, 48 bits of the digest message to source MAC addresses of the cameras for the plurality of vehicles.

The formation unit 620 is a unit for forming a mesh structure by bi-directionally connecting the cameras for the plurality of cameras to neighbors based on a relationship between the received digests, and forms a mesh structure of a set of meshes by creating a set of meshes corresponding to a specific accident and performing bi-directional connections of all adjacent digests using the created set of meshes.

Then, the formation unit may form the mesh structure corresponding to a specific location by, when an investigation for a specific location is required, searching for a trusted digest of the received digests, which is closest to the specific location that is required to be investigated and by creating bi-directional edges between adjacent digests by using the discovered trusted digest and the digests corresponding to the specific location. That is, the formation unit 620 forms the mesh structure by validating mutual neighbors between adjacent digests and by creating bi-directional edges between digests.

The verification unit 630 is a unit for, of a mesh structure is formed, verifying times and locations for the digests that constitute a mesh structure based on the formed mesh structure, and verifies times and locations for the digests corresponding to the specific location that is required to be investigated by determining participation of the digests constituting the mesh structure by the exchange of digests with the cameras for the surrounding vehicles and by determining the digest that participates through the exchange of the digests as a legitimate digest and determining the digest as a fake digest otherwise.

Further, the verification unit 630 may verify the times and locations for the digests corresponding to the specific location that is required to be investigated by evaluating trust scores for the digests that form the mesh structure and determining legitimacy for the digests based on the evaluated trust scores.

Then, the trust score for the digests constituting the mesh structure based on the trust score of the trust digest and the trust score may be evaluated by a specific algorithm, for example, a trust rank algorithm.

The storage unit 640 is a unit for storing data for performing the present invention, and stores a trust score evaluation algorithm, digests received from cameras for a plurality of vehicles, and original data corresponding to the verified digests. Of course, the storage unit 640 stores all pieces of data for performing the present invention.

Moreover, although the method and the apparatus according to the present invention may provide a solution for verifying time and location while guaranteeing the anonymity of the user by using a VD, the present invention is not limited thereto, and a map structure may be formed by using a profile including a time and a location of image data of a camera for a vehicle and a map may suggest a random walk based location verification algorithm.

Here, each video is represented in an implicated form called a view profile (VP), the VP, for example, may be constituted by VDs that are hash values of all moments, for example, per one second, and the VPs establish connection relationships with adjacent VPs through inter-vehicle communication and may be used to verify time and site later. That is, through inter-vehicle communication, the hash value of a currently captured video (or an image) may be exchanged between vehicles.

The method of using a VP also may be constituted by three sequences such as creation of a VP, construction of a view map, and verification of a VP, and the construction of a view map and the verification of a VP correspond to the construction of a view mesh and the verification of a VD, which have been described above, and thus the creation of a VP will be described hereinafter.

(1) Creation of View Profile

Broadcasting of Current Snapshot: At every moment, vehicle A creates VP ($VPu_i$) of u recorded for i seconds, and current $VPu_i$ is broadcast as in Equation 7 by using dedicated short-range communication.

$$A \text{ - - - >*}: T_{ui}L_{ui}Fui,R_u,H(T_{ui}|L_{ui}|F_u I_{Hui-1}|u^{i-1}{}_1) \quad \text{[Equation 7]}$$

Here, $T_{ui}$, $L_{ui}$, and $F_{ui}$ may refer to a time, a location, and the size of bites of a video (or DCV) at an i-th second. The cascade hash operation makes it easy to create a VP for a specific time period regardless of the entire file size.

The original video u including a hash H may not be exposed in VDu, may be provided to the system after VPu is verified, and may be anonymously requested. Value Ru may be derived from Ru=H(Qu), and Qu may be used for anonymous compensation later with a secret number of a file u selected by vehicle A.

Reception of Adjacent VDS: Further, each vehicle A receives a broadcast message of VDv from vehicle B that is adjacent to or close to Vehicle A as in Equation 8.

$$B \text{ - - - >*}: T_{vj}L_{vj}Fvj,R_v,H(T_{vj}|L_A|F_A I_{Hvj-1}|v^{j-1}{}_j) \quad \text{[Equation 8]}$$

Here, $T_A$, $L_A$, and $F_{vj}$ may refer to a time, a location, and the size of bites of a video (or DCV)$_v$ at a j-th second.

Vehicle A inspects validity by checking $Tv_j$ and $Lv_j$ are within an acceptable range if receiving VDvj from an adjacent vehicle. That is, it is identified whether Tvj is within the current one second interval or $Lv_j$ is within a radius of DSRC communication, and if the condition is satisfied, vehicle A determines that $VDv_j$ is valid. Each vehicle mostly maintains tracks of two valid VDs, for example, the first and final reception VDs having the same value of R for an adjacent track. Vehicle A updates N'u by storing $VDv_j$ in a temporary memory N'u. That is, N'u is updated by replacing the final VD of the same Rv stored in N'u with VDvj.

Creation of New VP: If one-minute video file u is created, each vehicle A creates VPu that is a view profile thereof. Vehicle A inserts adjacent VDs stored in N'u into a bloom filter bit array Nu. This partially reflects an adjacent VP accumulation fingerprint as well as a contact time interval. Vehicle A compiles all of the VDs thereof and a bloom filter bit array Nu in VPu. Vehicle A starts a new round to initiate all temporary memories and create a VP for the next recording video.

Uploading of VPs: Each vehicle anonymously uploads the past VPs on the system as a potential proof whenever the vehicle is connected to a network. Of course, the past VPs may be anonymous uploaded on the system by using a predetermined tool for transmitting an anonymous message. For example, VPs may be anonymously uploaded on the system by using Tor. In particular, the present invention may utilize a smartphone of the user in which a Tor client application is installed as a breezing device for delivering a VD from a dash cam to the system, and may utilize a smartphone of the user in which a Tor client application is installed, and the system accumulates the VPs anonymously submitted from the users.

(2) Construction of View Map

Here, a general case and a particular case of a ground-truth node will be described.

General case: In order to search for a video proof of an accident, the system creates a set of view maps corresponding to a preset unit time, for example, one minute for a period of the accident. That is, the view maps for the given accident are independent according to time.

Accordingly, hereinafter, construction of a single view map constructed while having only a VP that is in a time t from any one-minute time interval t will be described.

When an investigation is required, the system searches for trusted VPs that are closest to a corresponding investigation location I. Here, the trusted VPs may refer to VPs, such as a police car or a special VP, which are determined or defined in advance. All the VPs are located in area C including the investigation location I, and the VPs are members of view maps.

The system searches for adjacent candidates VPv, of which locations Lui and Lvj of the leaders of the members are within a predetermined distance Δ from the members VPu.

Mutual neighboring between VPu and VPv is validated through a membership query for Nv and Nu, and a view map is formed, that is, constructed by creating an edge between bi-directional adjacent VPs in this way. The edge may be named a view link.

Particular case: Clear VPs of the accident may be identified by using ground-truth VPs of the accident vehicle. In this case, a trusted VP based view map is not necessary, and the original videos of adjacent VPs linked to VPS may deserve to be uploaded for review of persons.

(3) Verification of VP

If a view map for a location of investigation is given through construction of a view map, the system uses unique features of a VP link structure to discover a fake VP. To achieve this, the system may evaluate trust cores for all members VPs, and in order to evaluate the trust scores, the system may apply a specific algorithm, for example, a trust rank algorithm to the view map.

In the view map, the trust VP, for example, a police car functions as a ground-truth node, and the system identifies a legitimate VP from a fake VP based on a trust score result according to a topology of the view map.

Figure 8:
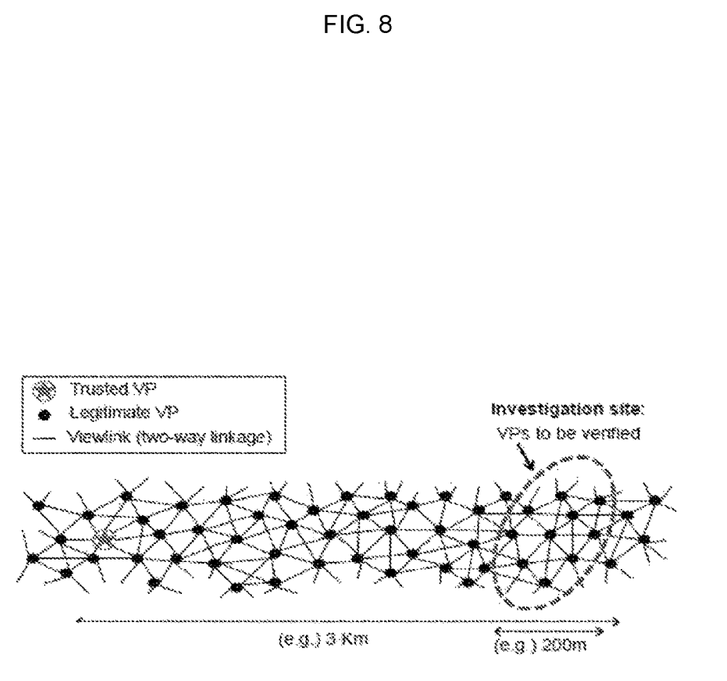
FIG. 8 illustrates an exemplary view of a view map having legitimate VPs.

In detail, as illustrated in an example of FIG. 8, if the constructed view map is given, the system determines whether the VPs in the investigation location are legitimate.

For example, the system may identify the VPs as legitimate VPs when the VDs participate in the view map through exchange of VDs, and otherwise, may identify or determine the VPs as fake VPs. Here, the legitimacy relates not to contents but to a location and a time of a VP, and validates the location and the time of the corresponding VP. The verification solution, that is, the view map according to the present invention may help a human investigator who directly identifies a VP by automatically identifying the legitimate VP.

Figure 9:
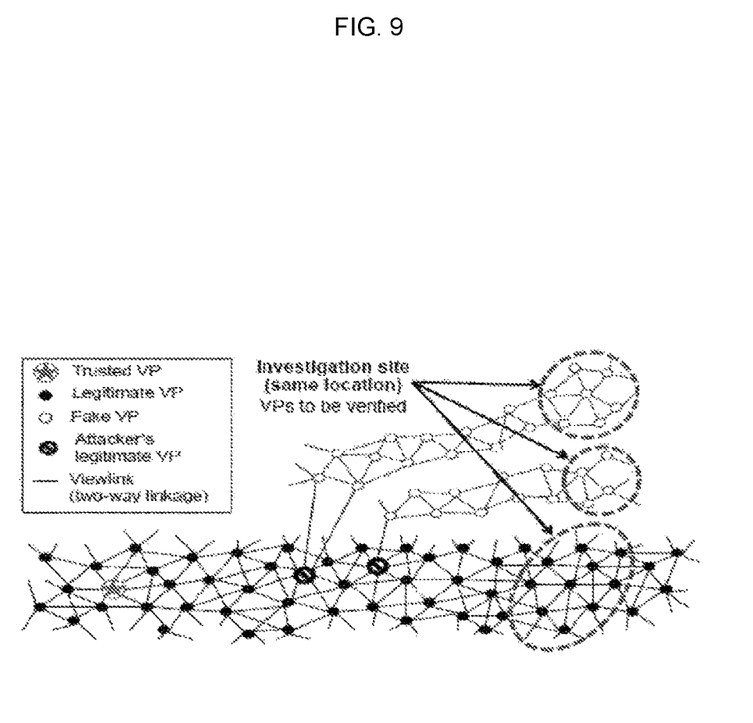
FIG. 9 illustrates an exemplary view of view maps having fake VPs.

The constructed view map may appear as a single layer as illustrated in FIG. 8 when all the members are legitimate VPs, and may result in a multi-layer structure as illustrated in FIG. 9 when the members have a fake VP and may have one layer of the multi-layers, which includes a trusted VP.

A multi-layer structure appears when the view map is constructed to include a fake VP because the attackers are prevented from making edges between fake VPs and legitimate VPs without substantial exchange of VPs by validation of bi-directional links. Therefore, the attackers may insert fake VPs by simply linking them to a legitimate VP. Moreover, location close checking of adjacent VPs disenables long-distance edges, and accordingly, the attackers compulsorily create chains of fake VPs to position some of the fake VPs at a target location as illustrated in FIG. 9.

A main point of the multi-layer view map illustrated in FIG. 9 is that VP links are more densely distributed than a cross layer link in the single layer. In an example of FIG. 9, if a source is started from a trusted VP VPz, it moves at random along an edge from the view map. For a given investigation location X, a probability of visit of a VP at X of a layer of z, that is, a legitimate VP is higher than a probability of visit of a VP at X of other layers, that is, a fake VP, and this is because at X, visit of a fake VP requires a random walk to review a cross layer edge from a legitimate VP of a specific attacker.

To use a random work in a link structure of a view map, the present invention uses a specific algorithm, for example, a trust rank algorithm. The trust rank algorithm is a modification of a well-known page rank, and distribution of probabilities of likelihood of starting from a seed page and reaching a specific page is output when a person clicks at random on a link. In this case, as a seed page, the trusted VP has a probability (trust score) of 1, and the score is equally divided to all adjacent links and is distributed to other adjacent VPs. The repetitions of the process propagate the trust score to all the VPs corresponding to a random walk on a view map.

Then, by the trust rank algorithm, the trust scores P of all the VPs may be calculated through repetitions of a matrix operation illustrated in Equation 9 for a given view map G.

$$P = \alpha * M * P + (1-\alpha) * d \quad \text{[Equation 9]}$$

Here, M refers to a transition matrix that represents a VP link of a view map G, d refers to a trust score distribution vector having an entry for a trusted VP, and a refers to a set damping factor. Then, the trust score may be obtained through convergence of P.

A process of identifying a legitimate VP by the system will be described as follows.

If a trust VPz and an investigation location X are given, the VPs at X of a z layer have higher trust scores than the VPs at X of another layer. This is particularly valid when the number of the frank users is much larger than the number of the attackers, and this is because the random walk has more opportunities of using edges in a basic layer of z than when a cross layer edge is used.

Further, the undirected edges in the view map may move bi-directionally so that even a crossed edge may make an opportunity of staying in another weak layer. That is, the undirected edges may move again as a basic layer. Accordingly, the system identifies a highest trust score VPu as a legitimate VP.

Then, the system also may determine all VPs that may reach u through the VPs of X as legitimate VPs.

As described above, the verification framework according to another embodiment of the present invention may verify a location and a time of image data of a camera of a vehicle while guaranteeing the anonymity of the user through creation and exchange of VPs, construction of a view map, and verification of the VP using them.

In this way, in another embodiment of the present invention, the time and location of data may be verified while the anonymity of user is guaranteed by using a data orienting technique of image data of a camera for a vehicle, and accordingly, it is easy to collect image data of a camera for a vehicle, such as a DCV, by providing the verification frame work of the present invention.

Of course, the part for the verification of the time and location of data using a VP may include all the contents for verifying the time and location of the data by using the VD.

The verification framework using the VP may be provided to the method, the apparatus, or the system.

The method, the apparatus, and the system according to the embodiments of the present invention are not limited to those based on image data of a camera for a vehicle, and may be applied to data for a mobile device. That is, time and location may be verified while the anonymity of the owner or user is secured by using data of a mobile device.

The above-described system or apparatus may be realized by a hardware element, a software element, and/or a combination of a hardware element and a software element. For example, the system, the apparatus and the elements described in the embodiments, for example, may be realized by using one or more general-purpose computer or a specific-purpose computer such as a processor, a controller, an arithmetic logic unit (ALU), a digital signal processor, a microcomputer, a field programmable array (FPA), a programmable logic unit (PLU), a microprocessor, or any device that may execute and respond to an instruction. The processing device may perform an operation system and one or more software applications performed on the operating system. Further, the processing device may access, data, manipulate, process, and produce data in response to execution of software. Although one processing device is used for convenience of understanding, it may be easily understood by those skilled in the art that the processing device may include a plurality of processing elements and/or a plurality of types of processing elements. For example, the processing device may include a plurality of processors or one processor and one controller. Further, another processing configuration, such as a parallel processor, may be possible.

The software may include a computer program, a code, an instruction, or a combination of one or more thereof, and the processing device may be configured to be operated as desired or commands may be made to the processing device independently or collectively. The software and/or data may be permanently or temporarily embodied in any type of machine, a component, a physical device, virtual equipment, a computer storage medium or device, or a signal wave transmitted in order to be interpreted by the processing device or to provide an instruction or data to the processing device. The software may be dispersed on a computer system connected to a network, to be stored or executed in a dispersive method. The software and data may be stored in one or more computer readable recording media.

The method according to the embodiment may be implemented in the form of a program instruction that maybe performed through various computer means, and may be recorded in a computer readable medium. The computer readable medium may include a program instruction, a data file, and a data structure alone or in combination thereof. The program instruction recorded in the medium may be designed or configured particularly for the embodiment or may be a usable one known to those skilled in computer software. An example of the computer readable recording medium may include magnetic media such as a hard disk, a floppy disk, and a magnetic tape, optical recording media such as a CD-ROM and a DVD, magneto-optical media such as a floptical disk, and hardware devices that are particularly configured to store and perform a program instruction, such as a ROM, a RAM, and a flash memory. Further, an example of the program instruction may include high-level language codes which may be executed by a computer using an interpreter as well as machine languages created by using a compiler. The above-mentioned hardware device may be configured to be operated as one or more software module to perform operations of various embodiments, and the converse is applied.

Although the embodiments of the present invention have been described with reference to the limited embodiments and the drawings, the present invention may be variously corrected and modified from the above description by those skilled in the art to which the present invention pertains. For example, the above-described technologies can achieve a suitable result even though they are performed in different sequences from those of the above-mentioned method and/or coupled or combined in different forms from the method in which the constituent elements such as the system, the architecture, the device, or the circuit are described, or replaced or substituted by other constituent elements or equivalents.

Therefore, the other implementations, other embodiments, and the equivalents of the claims pertain to the scope of the claims.

The invention claimed is:

1. A method for verifying times and locations of image data of cameras for vehicles, the method comprising:
anonymously receiving digests including locations and times of data created by cameras for a plurality of vehicles, respectively, wherein each digest is disassociated from an ownership identification of at least a portion of the data created;
forming a mesh structure by bi-directionally connecting the cameras for the plurality of vehicles to cameras for adjacent vehicles, based on a relationship between the received digests; and
if the mesh structure is formed, verifying times and locations for the digests constituting the mesh structure based on the formed mesh structure,
wherein the receiving of the digests includes:
anonymously receiving the digests from the cameras for the plurality of vehicles, by changing predetermined numbers of first bits of digest messages to source MAC addresses of the cameras of the plurality of vehicles by the cameras of the plurality of vehicles.

2. The method of claim 1, wherein the receiving of the digests includes:
receiving a digest of a camera for a host vehicle and the digests received from cameras for adjacent surrounding cameras from the cameras for the plurality of vehicles, by broadcasting the digests of the data created by the cameras for the plurality of vehicles to the cameras for the adjacent surrounding vehicles and by receiving digests broadcast from the cameras for the adjacent surrounding vehicles.

3. The method of claim 1, wherein the forming of the mesh structure includes:
forming the mesh structure, by searching for a predetermined trusted digest, of the received digests, which is closest to a preset location and by creating an edge between bi-directional adjacent digests by using the discovered trusted digest and the digests corresponding to the preset location.

4. The method of claim 3, wherein the verifying of the times and the locations includes:
verifying the times and the locations for the digests corresponding to the preset location, by evaluating trust scores for the digests corresponding to the preset location based on a trust score of the trusted digest and by determining legitimacies of the digests corresponding to the preset location based on the evaluated trust score.

5. The method of claim 3, wherein the verifying of the times and the locations includes:
verifying the times and the locations for the digests corresponding to the preset location, by determining participations of the digests constituting the mesh structure by exchange of digests with the cameras for the surrounding vehicles and by determining a digest that participates by the exchange of the digests as a legitimate digest.

* * * * *